(12) United States Patent
Su

(10) Patent No.: US 6,171,722 B1
(45) Date of Patent: Jan. 9, 2001

(54) FORMING TANK AND ELECTRIC PLATE ARRANGEMENT

(76) Inventor: Chao-Nan Su, No. 287, Sec 3, Tung-Men Rd., Tainan (TW)

( * ) Notice: Under 35 U.S.C. 154(b), the term of this patent shall be extended for 0 days.

(21) Appl. No.: 09/218,049

(22) Filed: Dec. 22, 1998

(51) Int. Cl.[7] .................................................. H01M 2/02
(52) U.S. Cl. ............................................ 429/176; 429/163
(58) Field of Search .................................... 429/176, 153, 429/163

(56) References Cited

U.S. PATENT DOCUMENTS 3,754,994 * 8/1973 Roach ..................................... 136/34

* cited by examiner

Primary Examiner—Stephen Kalafut
Assistant Examiner—Monique Wills
(74) Attorney, Agent, or Firm—Dougherty & Troxell

(57) ABSTRACT

A forming tank includes a tank body having an inside step, and two brackets supported on the step and arranged in parallel inside the tank body to hold two metal rods, two insulative members, positive and negative plates, and two spacer combs, the brackets being movable relative to each other so that the pitch between the brackets can be adjusted subject to the size of the positive and negative plates used.

1 Claim, 6 Drawing Sheets

FORMING TANK AND ELECTRIC PLATE ARRANGEMENT

BACKGROUND OF THE INVENTION

The present invention relates to a forming tank, and more particularly to such a forming tank that can be conveniently adjusted subject to the size of the electrodes used.

U.S. Pat. No. 3,754,994 discloses a forming tank for the plates of a lead-acid storage battery. In the forming tank for the plates of a lead-acid storage battery, a tank A is filled with electrolyte, a pair of brackets A1 supported by the tank A on each side thereof, a pair of connector bars A2 supported in the tank cooperating with the brackets A1 at each side of the tank A, a pair of a spacer unit A3 cooperating with each connector bar A2 having openings A4 to expose one connector bar A2 to the lugs A6 of a double plate group, the openings A4 being separated by open cup-shaped portion A5 adapted to support the lugs A7 of an adjacent double plate group of opposite polarity, the openings A4 and cup-shaped portion A5 being proportioned and spaced so that separate plate group of given polarity are supported and electrically connected to the plate lugs A6 at one end while at the other the lugs A7 are supported in insulated relation with the opposite connector bar A2, a spacer comb A8 positioned between the plate groups of opposite polarity to avoid short-circuit. This forming tank design has numerous drawbacks. Because a plurality of tanks A are connected in a line by brackets A1, the whole line of tanks A must be stopped from operation when one particular tank A has to be repaired. Because each bracket A1 is fastened to two adjacent tanks A, different brackets A1 should be used to fit different sizes of tanks A. Still another drawback of this forming tank design is the minor contact area between the conductor bars A2 and the lugs A6. Furthermore, lugs A6 and A7 of opposite polarity may be installed in the openings A4 and cup-shaped portion A5 at spacer units A3 erroneously, causing a short circuit.

SUMMARY OF THE INVENTION

The present invention provides a forming tank which is comprised of a tank body, two brackets supported on a step inside the tank body and arranged in parallel to hold two metal rods, two insulative members, positive and negative plates, and two spacer combs. The metal rods, the insulative members, the plates and the spacer combs are respectively replaceable. The brackets can be moved relative to each other to adjust the pitch therebetween subject to the size of the electric plates used. The plates each have two lugs at two opposite ends for positive positioning.

DETAILED DESCRIPTION OF THE PREFERRED EMBODIMENT

Figure 1:
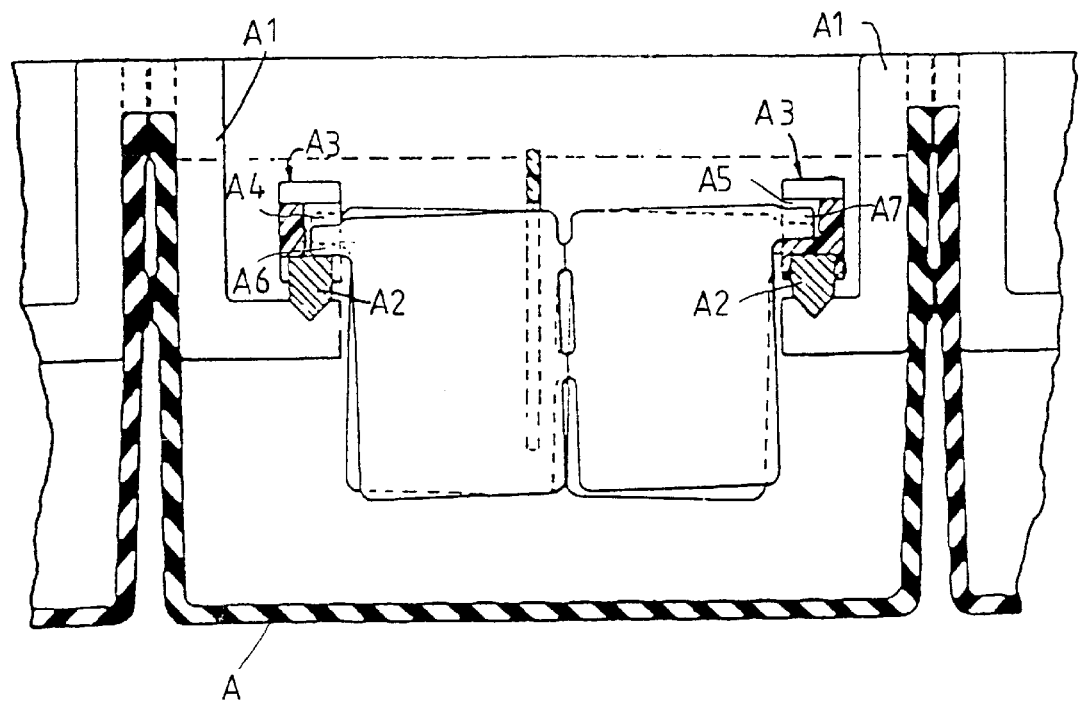
FIG. 1 is a transverse view in section of a forming tank according to the prior art.
Figure 2:
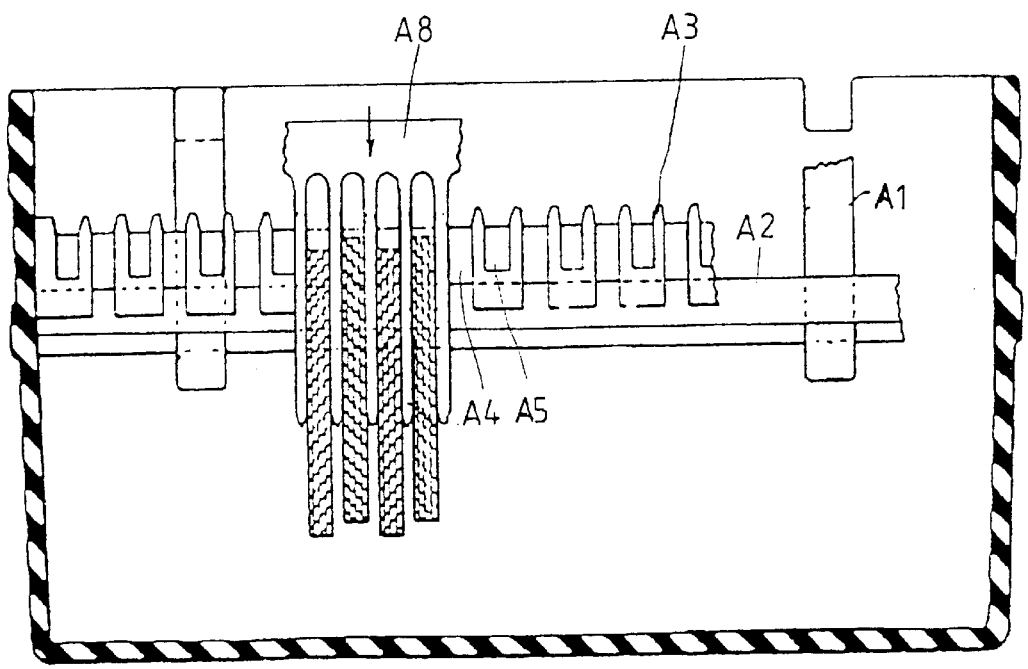
FIG. 2 is a longitudinal view in section of the forming tank shown in FIG. 1.
Figure 3:
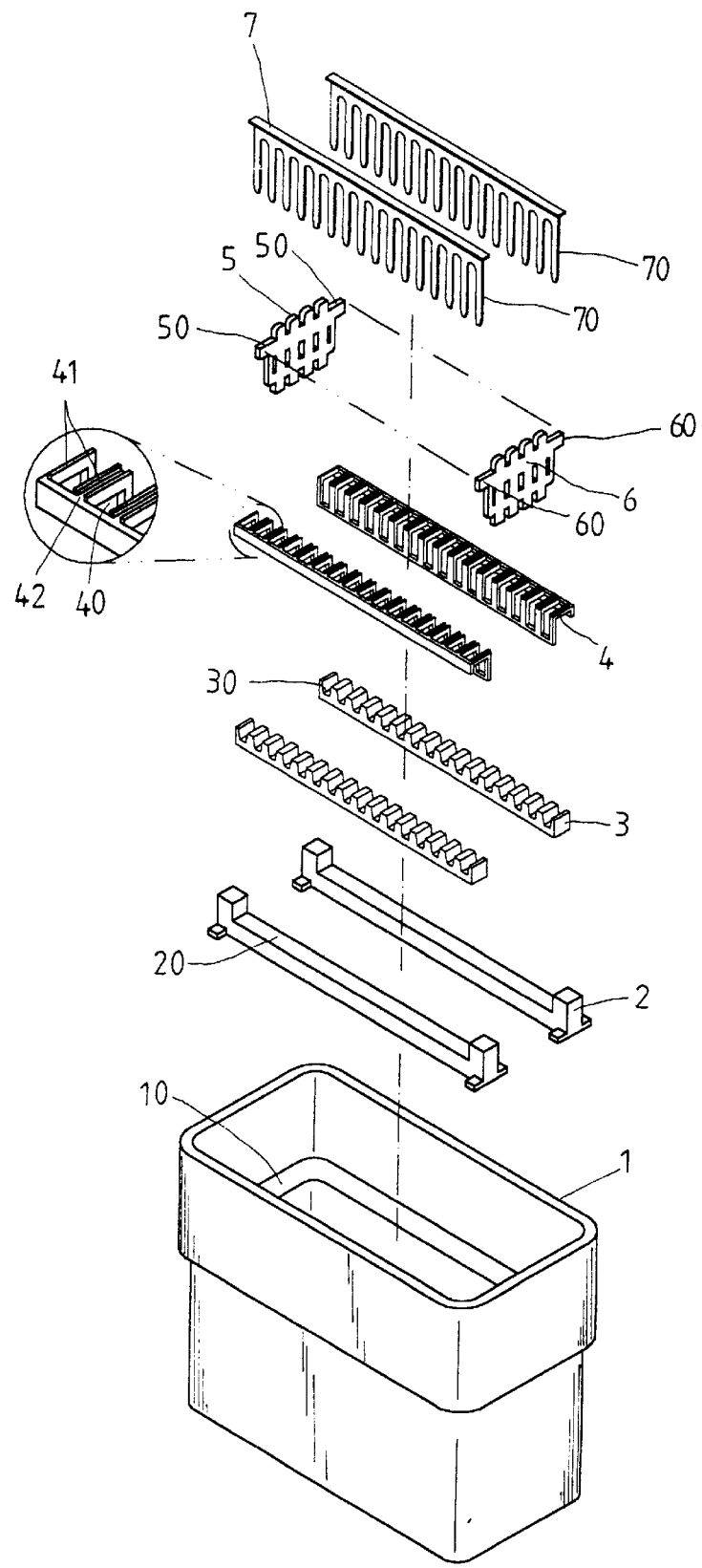
FIG. 3 is an exploded view of a forming tank according to the present invention.

Referring to FIG. 3, a forming tank in accordance with the present invention is generally comprised of a tank body 1, the tank body 1 having a step 10 raised around the inside wall thereof, two elongated brackets 2 supported on the step 10 and longitudinally arranged in parallel inside the tank body 1, the brackets 2 each having a longitudinally extended flat receiving portion 20, two elongated metal rods 3 respectively mounted in the flat receiving portions 20 of the brackets 2, the metal rods 3 each having a plurality of transversely extended and equally spaced V-grooves 30, two insulative members 4 shaped like a slotted angle bar and respectively symmetrically covered on the metal rods 3, the insulative members 4 each comprising a plurality of ribs 41 and a plurality of openings 40 and notches 42 alternatively separated by the ribs 41 corresponding to the V-grooves 30 at the metal rods 3, a plurality of positive plates 5 and negative plates 6 alternatively arranged inside the tank body 1 and respectively inserted into the openings 40 and the notches 42 between the insulative members 4, the plates 5 and 6 each having two lugs 50 or 60 at two opposite ends. and two spacer combs 7 respectively fastened to the plates 5 and 6 at the top side and longitudinally arranged in parallel inside the tank body 1, the spacer combs 7 each having a plurality of teeth 70 arranged in parallel.

Figure 4:
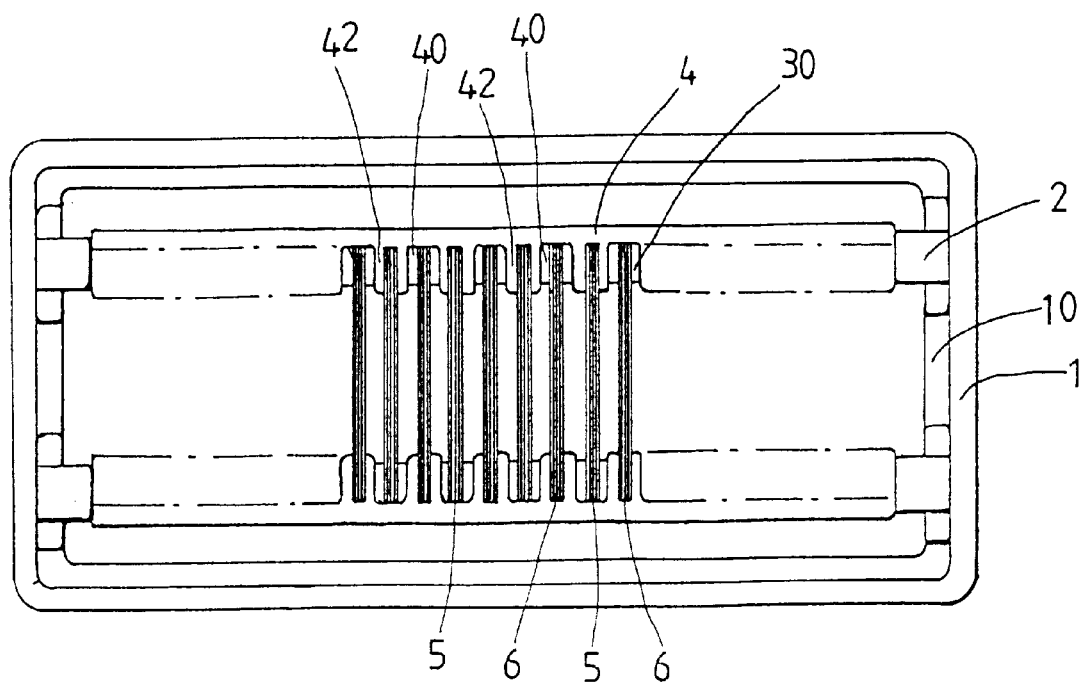
FIG. 4 is a top plain view of the present invention.
Figure 5:
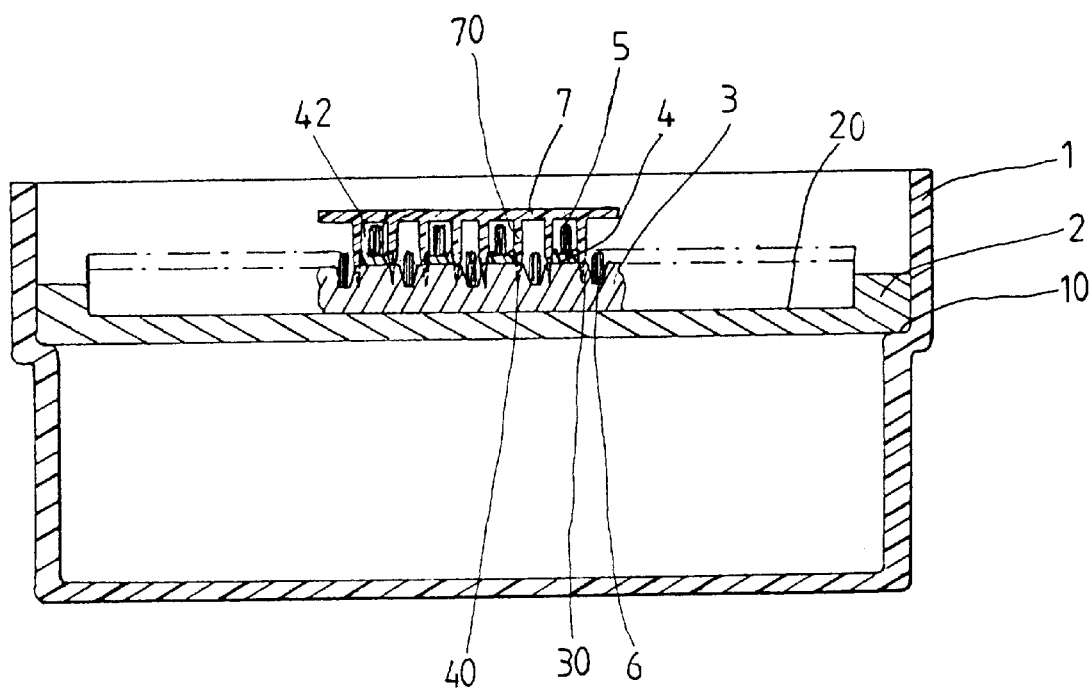
FIG. 5 is a longitudinal side view in section of the present invention.

Referring to FIGS. 4 and 5 and FIG. 3 again, when in use, the brackets 2 are longitudinally arranged in parallel inside the tank body 1 and supported on the step 10, then the metal rods 3 are respectively mounted in the flat receiving portion 20 at the brackets 2, and then the insulative members 4 are respectively covered on the metal rods 3, enabling the V-grooves 30 to be respectively aimed at the openings 40 at the insulative members 4, and then the plates 5 and 6 are alternatively arranged between the insulative members 4, enabling the lugs 50 and 60 of the plates 5 and 6 to be fastened to the openings 40 and V-grooves 30 and the notches 42 respectively (see FIG. 5), and then the spacer combs 7 are respectively fastened to the plates 5 and 6 at the top side and longitudinally arranged in parallel inside the tank body 1, enabling the teeth 70 of the spacer combs 7 to be respectively inserted into the openings 40 and notches 42 to separate the positive plates 5 from the negative plates 6 and avoid short circuit.

Figure 6:
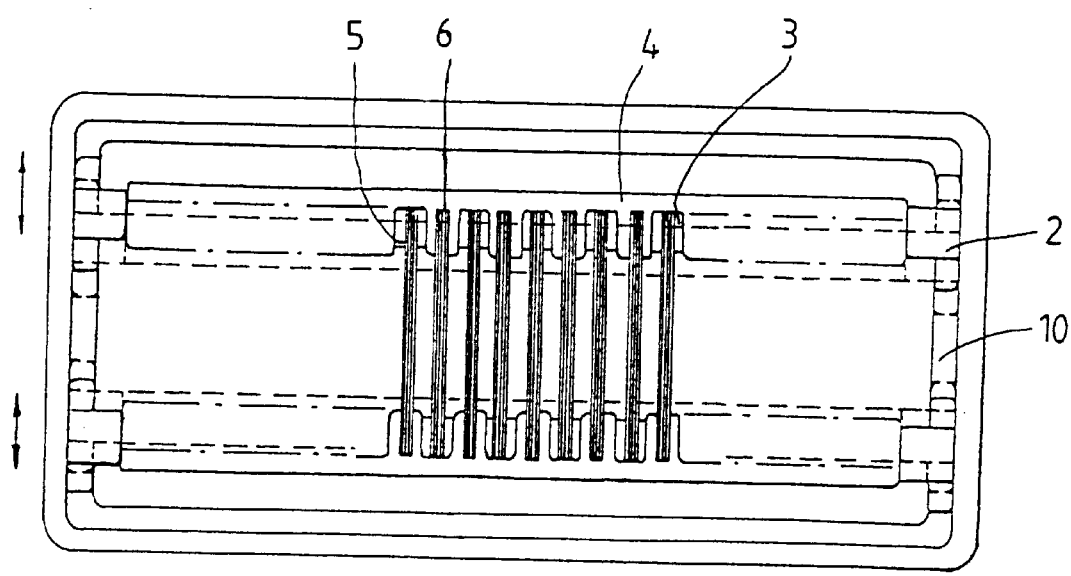
FIG. 6 is a schematic drawing showing the pitch between the brackets adjusted.

Referring to FIG. 6, the brackets 2 can be moved transversely on the step 10 to adjust the pitch therebetween subject to the side of the plates 5 and 6. Furthermore, the aforesaid arrangement allows the user to replace the brackets 2 and the insulative members 4 conveniently.

Figure 7:
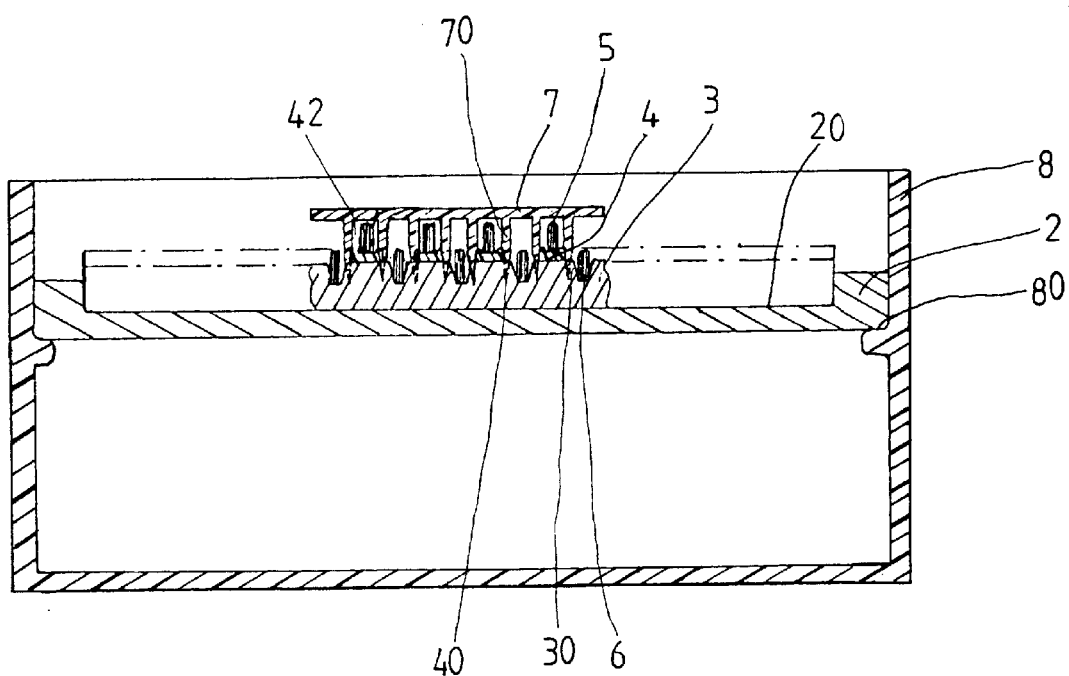
FIG. 7 is a sectional view of an alternate form of the present invention.

FIG. 7 shows an alternate form of the present invention. According to this alternate form, the tank body, referenced by 8, has a flange 80 raised around the inside wall thereof, and two brackets 2 mounted supported on the flange 80 and arranged in parallel inside the tank body 8 to hold two metal rods 3, two insulative members 4, positive and negative plates 5 and 6, and two spacer combs 7.

It is to be understood that the drawings are designed for purposes of illustration only, and are not intended as a definition of the limits and scope of the invention disclosed.

What is claimed is:

1. A forming tank comprising:
a rectangular shaped tank body, said tank body having an integral step raised from an inside wall thereof;
two elongated brackets movably supported on the step inside said tank body for movement in a transverse direction and arranged in parallel, said brackets each having a longitudinally extending flat receiving portion on a top side thereof;

two elongated metal rods respectively mounted in the flat receiving portions of said brackets, said metal rods each having a plurality of transversely extended and equally spaced V-grooves;

two longitudinally extending insulative members having a generally J-shaped cross section with a plurality of cross members and first and second longitudinally and downwardly extending portions connected by said cross members respectively mounted on said metal rods with said first and second longitudinally and downwardly extending portions on opposite sides of said elongated metal rods, said insulative members including said cross members forming a plurality of openings and notches alternatively spaced by said cross members;

a plurality of positive plates and a plurality of negative plates alternatively arranged inside said tank body between said insulative members, said positive plates each having two lugs at two opposite sides respectively inserted into the notches at said insulative members, said negative plates each having two lugs at two opposite sides respectively inserted into the openings at said insulative members and the V-grooves at said metal rods; and two spacer combs respectively fastened to said positive plates and said negative plates at a top side and arranged in parallel inside the tank body, said spacer combs each having a generally T-shaped cross section and a plurality of teeth arranged in parallel and respectively inserted into the openings and notches at said insulative member.

\* \* \* \* \*